Dec. 3, 1968   W. J. DENKOWSKI   3,414,097
TORQUE AND/OR THRUST OPERATOR
Filed May 31, 1967   4 Sheets-Sheet 4

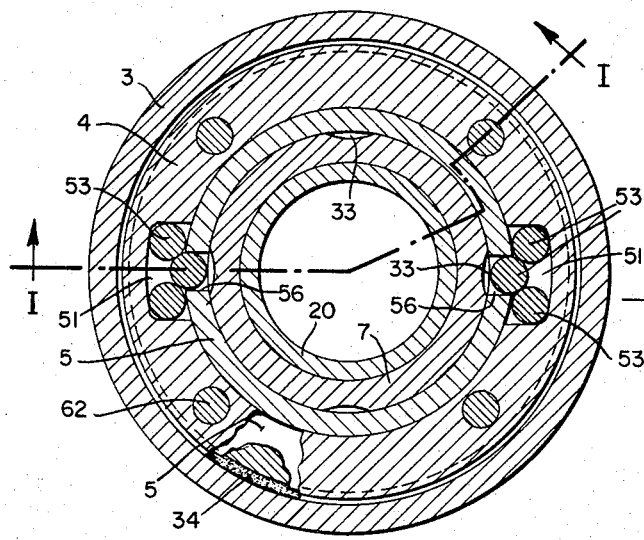
Fig. 3
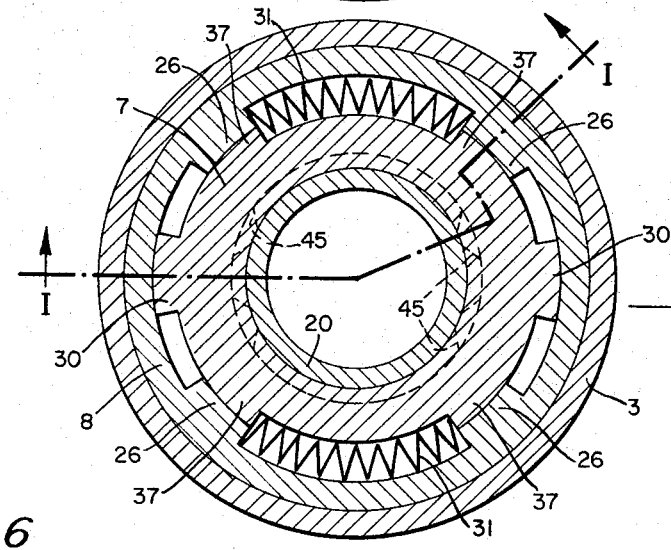
Fig. 4
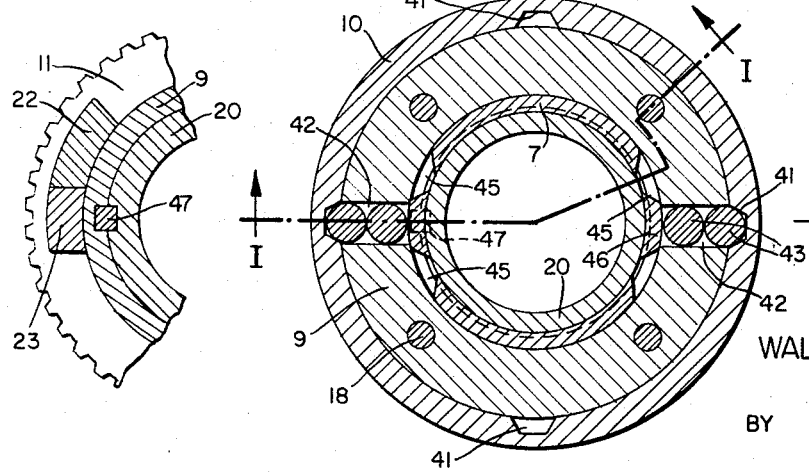
Fig. 6
Fig. 5
INVENTOR.
WALTER J. DENKOWSKI
BY Paul + Paul
ATTORNEYS.

INVENTOR.
WALTER J. DENKOWSKI
BY
Paul + Paul
ATTORNEYS.

United States Patent Office 3,414,097
Patented Dec. 3, 1968

3,414,097
TORQUE AND/OR THRUST OPERATOR
Walter J. Denkowski, King of Prussia, Pa., assignor to King of Prussia Research and Development Corporation, King of Prussia, Pa., a corporation of Pennsylvania
Filed May 31, 1967, Ser. No. 642,502
10 Claims. (Cl. 192—48.91)

ABSTRACT OF THE DISCLOSURE

A clutch comprising a rotatable load shaft which is driven either rotationally or linearly by being alternately clutched to either a handwheel or electric motor through a rigid element carrying radially movable clutching rollers.

---

This invention relates to a mechanism for coupling a load shaft selectively to either one or two drives, for driving the load shaft rotationally, or linearly as by a nut. In most cases, one of the drives will be a power drive and the other will be a manual drive, but so far as the torque and/or thrust operator mechanism of the present invention is concerned both drives could be power drives or both could be manual drives.

One of the more important uses or applications of the operator mechanism of the present invention is as a valve operator for driving a valve nut or stem. However, it is to be understood that the mechanism of the invention may be used in a variety of other applications and that its use is not limited to that of a valve operator.

The invention will be clearly understood from the following description of a preferred embodiment of the operator illustrated in the drawings in which:

FIGS. 3, 4 and 5 are diagrammatic views, in section, showing the relative positions of various component parts during motor-drive operation;

FIG. 6 is a diagrammatic view, in section and broken, showing the lug-on-lug engagement of the worm gear and motor clutch drive ring during motor-drive operation;

Figure 1:
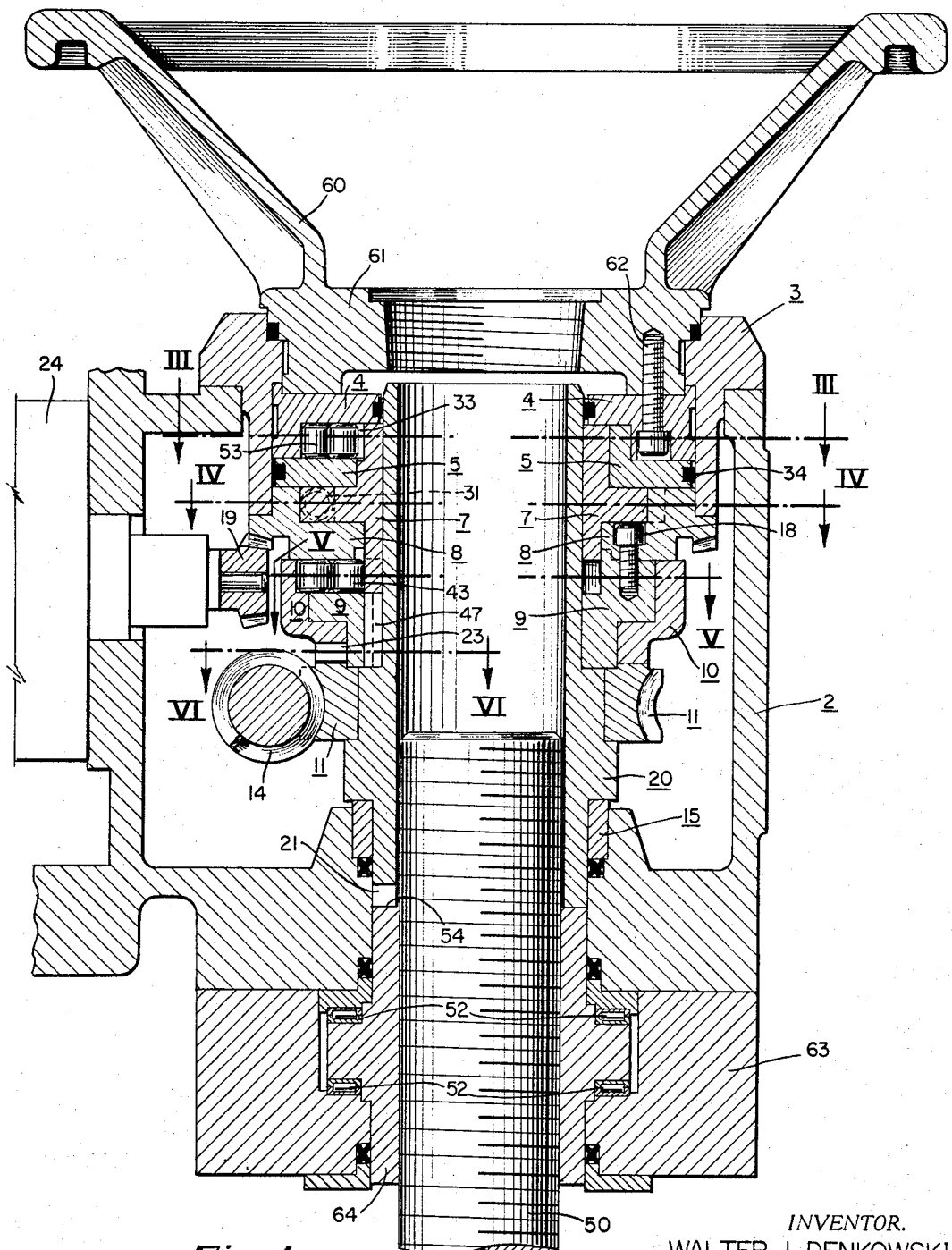
FIG. 1 is an elevational view, in section, of the operator, showing a top mounted handwheel.
Figure 2:
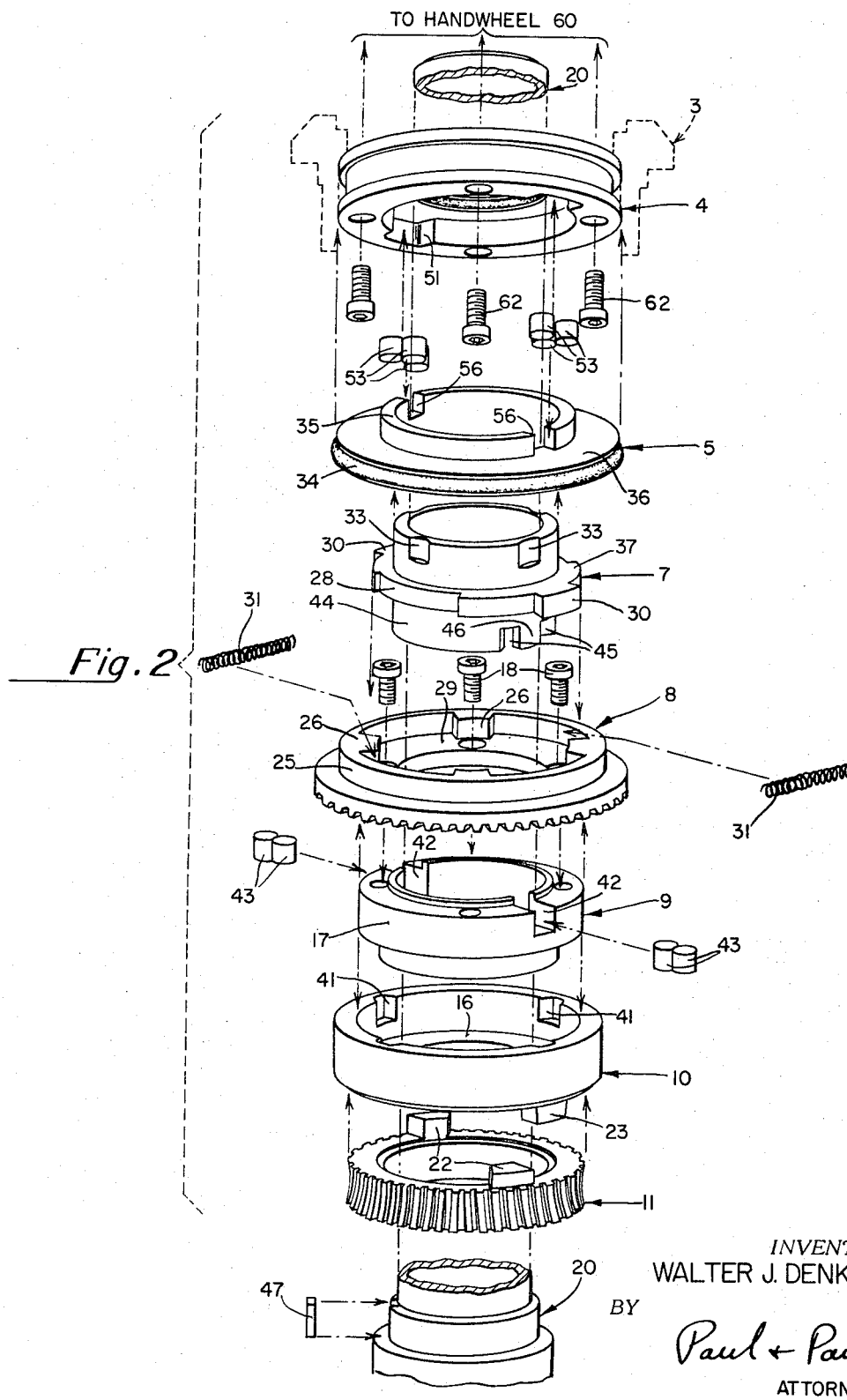
FIG. 2 is an exploded perspective view of the operator mechanism of FIG. 1.

Referring first to FIG. 1, an output shaft 50 is adapted to be driven linearly either by the hand wheel 60 or by the motor driven worm 14, as will be described hereinafter in detail. In FIG. 1, the output shaft 50 is externally threaded and is in threaded engagement with an internally-threaded output nut 64 which is mounted for rotation in bearings 52 in support collar 63. A pair of upwardly extending lugs 54 disposed 180° apart on output nut 64 are adapted to seat in a pair of slots 21 on the end of the main output drive sleeve 20, thereby coupling output drive sleeve 20 to nut 64. Drive sleeve 20 is shown supported for rotation in bushing 15 in main housing 2.

It is believed that it will be helpful first to describe the operator mechanism and its operation briefly without too much attention to structural details. Later these details will be described fully.

Worm 14, driven by motor drive not shown, drives worm gear 11 which encircles, and is supported on a shoulder of the main output drive sleeve 20, but worm gear 11 is not keyed directly to the sleeve 20. A pair of lugs 22 spaced 180° apart project upwardly from the upper face of worm gear 11 and these lugs 22 are adapted to abut against a pair of lugs 23, also spaced 180° apart, which project downwardly from the lower face of a cup-like ring 10 which functions as a motor clutch drive ring.

Thus, when worm gear 11 is driven rotationally by the motor drive, the motor clutch drive ring 10 is also rotationally driven, due to the lug-on-lug engagement of the lugs 22 and 23.

The lower portion of the motor clutch drive ring 10 is of smaller diameter than the upper portion, forming an annular support hub 16 which receives the larger diameter upper portion 17 of a T-shaped sleeve which functions as a clutch drive transfer ring 9 and is fastened to the output drive sleeve 20 by key 47.

Supported on the cluch drive transfer ring 9, and bolted thereto by bolts 18, is a handwheel clutch ring 8 having a bevel gear which engages with a horizontally mounted bevel gear 19. Bevel gear 19 is connected to and drives a geared limit mechanism 24. The connection of the bevel gear of the handwheel clutch ring 8 to bevel gear 19 is not an essential part of the present invention and will not be further referred to.

The handwheel clutch ring 8 has an upstanding collar or ring portion 25, and projecting radially inwardly from the inner surface of collar 25 are four lugs 26 spaced 90° apart.

Received within the center aperture of the handwheel clutch ring 8 is a sleeve 7 which functions as the handwheel clutch drive sleeve. Sleeve 7, at about its center, is provided with a radially extending multi-diameter flange 28. The largest diameter defines two lugs 30 at 180° spacing. The next largest diameter defines shoulders 37 on either side of the lugs 30. When the sleeve 7 is inserted within the handwheel clutch ring 8, the shoulders 37 rest on and are supported by the annular disc portion 29 of the clutch ring 8.

As has already been indicated, lugs 30 project radially outwardly from the shoulders 37. The peripheral edge portions of the projecting lugs 30 are located at substantially the same distance radially from the center axis as is the inner surface of the upstanding ring 25 of the handwheel clutch ring 8. Thus, when the handwheel clutch drive sleeve 7 is received within the handwheel clutch ring 8, the sides of the radially outwardly projecting lugs 30 are aligned with the sides of the radially inwardly projecting lugs 26 of the handwheel clutch ring 8. Inserted between opposing side faces of the outwardly projecting lugs 37 and the side faces of the inwardly projecting lugs 26 are compression springs 31. These springs 31 tend to keep the lugs 30 centered between the lugs 26, as seen in FIG. 4.

The upstanding portion of the handwheel clutch drive sleeve 7 which extends above the flange portion 28 is provided at its upper edge with four concave depressions 33 spaced 90° apart. This upper portion of sleeve 7 receives, and the flange 28 supports, the annular handwheel clutch rollers guide 5. The peripheral edge portion of the handwheel clutch rollers guide 5 includes a peripheral groove for receiving an O-ring 34. The upper surface of the handwheel clutch rollers guide 5 includes an upstanding collar 35 whose diameter is substantially less than the full diameter of the rollers guide 5. The upper surface of guide 5 functions as a shoulder 36 which receives and supports the handwheel clutch drive ring 4. The handwheel clutch drive ring 4 is secured, as by bolts 62, to the hub 61 of the handwheel 60.

As indicated hereinbefore, the purpose of the operator mechanism illustrated in the drawings, is to drive linearly the output shaft or screw 50 either through the motor driven worm 14 or the handwheel 60. Both drive the main output drive sleeve 20. The coupling between the motor drive worm 14 and the output drive sleeve 20, and the coupling between the handwheel 60 and the output drive sleeve 20, is in each case controlled by the action and positions of certain rollers, as will now be described.

Figure 9:
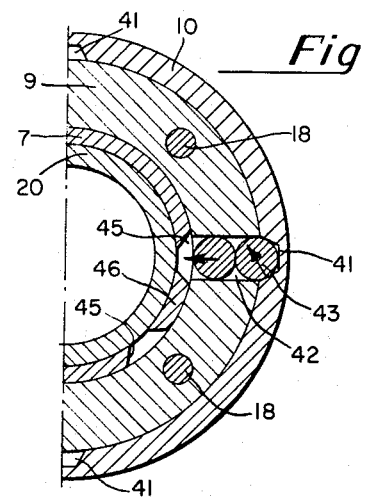
Figure 11:
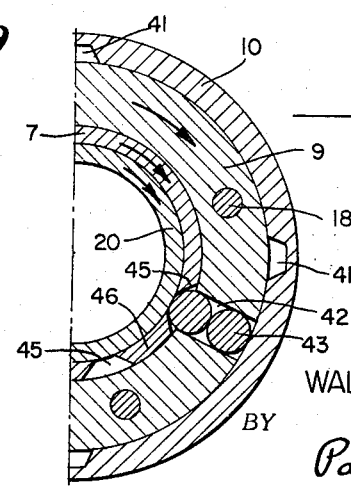

Referring again to the motor clutch drive ring 10, it will be seen that its upper edge is provided with four slots 41 at 90° spacing, and that the clutch drive transfer ring 9 is provided with two opposed slots 42 at 180° spacing. Slots 42 extend completely through the wall of the clutch drive transfer ring 9, and, in the embodiment illustrated, each of the slots 42 contains a pair of rollers 43. The sum of the diameters of the two rollers 43 in each slot 42 is appreciably greater than the width of the wall of the clutch drive transfer ring 9, that is, is greater than the length of the slot 42, and a portion, for example, one-third the diameter, of one of the rollers 43 projects from the slot 42. Under certain conditions, to be described, the projecting portion of one roller 43 is outward, in which case the projecting portion is received within one of the slots 41 of the motor clutch drive ring 10, as illustrated in FIGS. 5 and 9. Under other conditions, the projecting portion is that of the other roller 43 and is inward, in which case the projecting portion is received within one of the slots 45 of the lower skirt portion of sleeve 7, as illustrated in FIG. 11.

While it is preferred that at least two rollers 43 be contained in each slot 42, the mechanism being described will function with only one roller 43 in each slot, provided of course that the diameter of the roller is appreciably greater than the length of the slot 42.

The skirt portion 44 of the handwheel clutch drive sleeve 7 which extends downwardly below the flange 28 fits within the central bore of the handwheel clutch ring 8 and also within the central bore of the clutch drive transfer ring 9, with the lowermost portion of the skirt 44 extending down below the upper edge of the clutch drive transfer ring 9. The lower edge of skirt 44 is provided with two pairs of slots 45 located on opposite sides of the skirt. In motor drive operation, it is the solid or land portion 46 between each pair of slots 45 which is in alignment with the through slots 42 of the clutch drive transfer ring 9. Thus, in motor drive the rollers 43 are prevented from extending radially inwardly by the land 46, and, accordingly, a portion of one of the rollers 43 of each pair projects into one of the slots 41 of the motor clutch drive ring 10.

The operation of the operator mechanism in motor drive will now be described.

FIG. 6 is a view in section looking down along the line VI—VI of FIG. 1. As there shown, when the worm gear 11 is driven rotationally by the motor-driven worm 14, the upstanding lugs 22 of gear 11 abut against the depending lugs 23 of the motor clutch drive ring 10, and the motor clutch drive ring 10 is thereby driven rotationally. The pair of springs 31 maintains the lugs 30 of the handwheel clutch drive sleeve 7 centered between the lugs 26 of the handwheel clutch ring 8, as indicated in FIG. 4, wherein FIG. 4 is a view in section looking down along the line IV—IV of FIG. 1.

When the handwheel clutch drive sleeve 7 is in the angular position shown in FIG. 4, the land portions 46, located between each pair of slots 45, are in alignment with the slots 42 of the clutch drive transfer ring 9, as is illustrated in FIG. 5, wherein FIG. 5 is a view, in section, looking down along the line V—V of FIG. 1. Because the land 46 prevents any portion of the bearing rollers 43 from projecting radially inwardly, a substantial portion of one roller of each pair of rollers 43 in each of the slots 42 projects outwardly into the slots 41 of the motor clutch drive ring 10, as is illustrated in FIG. 5. Thus, when the motor clutch drive ring 10 is driven rotationally by the worm gear 11, the clutch drive transfer ring 9 is also driven rotationally due to the coupling between the ring 10 and ring 9 provided by the rollers 43. And, since the clutch drive transfer ring 9 is keyed, as at 47, to the main output drive sleeve 20, the main output drive sleeve 20 is driven rotationally, thereby rotating the output nut 64 and thereby moving the screw 50 linearly.

Attention is called to the fact that when the clutch drive transfer ring 9 is driven rotationally by the motor clutch drive ring 10, as just described above, the handwheel clutch drive sleeve 7 is free to move rotationally, and does move rotationally, being driven by the frictional engagement of the inner of the rollers 43 against the skirt 44 of the sleeve 7. Since rings 8 and 9, shown in FIGS. 4 and 5, are bolted together, as by bolts 18, these two rings 8 and 9 move rotationally as an integral unit. Thus, when ring 9 is motor driven rotationally by ring 10, the handwheel clutch drive sleeve 7 moves rotationally therewith, and the land portions 46 of skirt 44 of sleeve 7 remain in substantial alignment with the slots 42 or ring 9.

In motor drive, the upper portion of the handwheel clutch drive sleeve 7 above the flange portion 28, also, of course, rotates when the flange portion 28 is rotated by the clutch ring 8 through the springs 31, as had just been described. The handwheel clutch rollers guide 5, however, remains stationary, helped by the frictional drag of the O-ring 34 against the housing cover 3. The handwheel clutch drive ring 4 also remains stationary. Thus, there is no inward pressure on the rollers 53 and rollers 53 thus remain in the relative positions indicated diagrammatically in FIG. 3, as the handwheel clutch drive sleeve 7 rotates during motor drive operation.

If, during motor drive operation, the handwheel 60 were to be manually grabbed and rotated, the motor drive would become decoupled so long as the handwheel were being manually rotated. When the handwheel is no longer being manually rotated, the motor drive coupling would become reestablished. How this occurs will now be described.

When, during power operation, the handwheel is manually rotated, the rollers guide 5, due to the frictional drag of the O-ring 34 against the housing cover 3, fails to move immediately with the drive ring 4, and as a result the innermost roller of each of the groups of rollers 53 (FIG. 3) is forced radially inwardly in slot 56, and a portion of each innermost roller enters into the depressions 33 of the rotating sleeve 7 as the depressions 33 pass by the slots 56 of the handwheel clutch rollers guide 5. A coupling is thus established between the handwheel clutch drive ring 4 and the handwheel clutch drive sleeve 7, and the sleeve 7 is inhibited from rotating at a faster speed than the rotational speed of the handwheel. Thus, relative movement occurs between clutch ring 8 and sleeve 7 (FIG. 4) and, as a result, springs 31 (FIG. 4) become compressed, and slots 42 of transfer ring 9 move out of alignment with the land 46 and come into alignment with slots 45. The force exerted on the outer of rollers 43, by the motor driven ring 10 forces the rollers 43 to move radially inwardly, and the inner portion of the inner roller enters into one of the slots 45. Ring 10 is now free to rotate, and will rotate without driving the transfer ring 9, until the handwheel 60 is no longer rotated.

It will be seen from the foregoing that no harm is done either to the manual operator or to the mechanism in the event the handwheel is manually rotated while the power is on.

Figure 7:
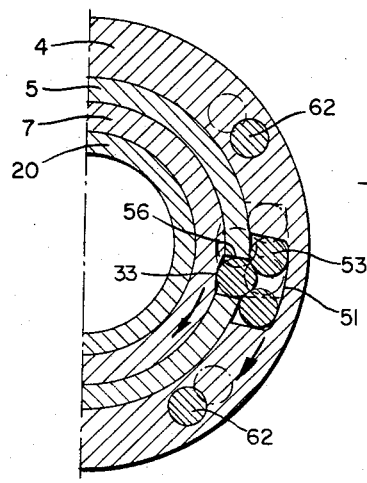
FIGS. 7–11 are diagrammatic views, in section, showing the relative positions of various component parts during manual-drive operation.

FIGS. 7–11 illustrate how the mechanism operates during handwheel operation, when the power is off. When the handwheel 60 is rotated, the handwheel clutch drive ring 4 rotates therewith, but the handwheel clutch rollers guide 5, due to the frictional drag imposed by the O-ring 34, as previously described, initially resists being rotated, and as a result, the innermost roller of each of the two groups of rollers 53 (each group having three rollers arranged as shown in FIG. 3) is forced radially inwardly in slot 56 of rollers guide 5. The rollers guide 5 now rotates, being dragged along with ring 4. When the slot 56 comes into alignment with one of the depressions 33 of the handwheel clutch drive sleeve 7, the inward portion of the innermost roller 53 enters into one of the depressions 33, as is indicated in FIG. 7, and the sleeve 7 now rotates with the ring 4, being coupled thereto by the rollers 53.

Figure 8:
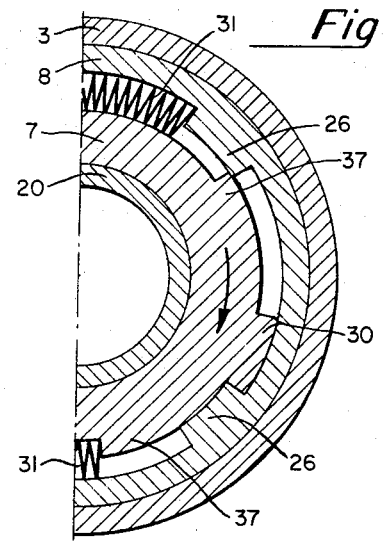

The handwheel clutch ring 8, which is coupled to the flange portion 28 of sleeve 7 through the springs 31, cannot rotate because it is prevented by motor clutch drive ring 10 and, accordingly, when sleeve 7 is manually rotated, as just described above, springs 31 are compressed by the projections 37 and the lugs 30 move rotationally relative to the handwheel clutch ring 8 until lugs 30 contact lugs 26 of ring 8. This is illustrated in FIG. 8. When this relative movement between sleeve 7 and ring 8 occurs, an identical relative movement takes place between sleeve 7 and ring 9 (since ring 9 is bolted to ring 8) and the lands 46 of skirt 44 move out of alignment with slots 42. One slot of each pair of slots 45 of skirt 44 of sleeve 7 now moves into alignment with the slots 42 of ring 9. This is illustrated in FIG. 9.

Figure 10:
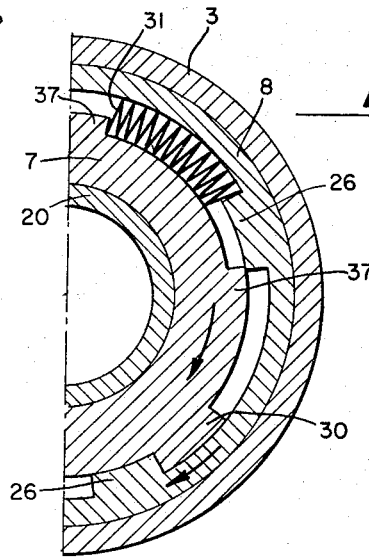

As sleeve 7, driven by the handwheel 60, continues to rotate, it carries the handwheel clutch ring 8 along with it, as is illustrated in FIG. 10. And, as depicted in FIGS. 9 and 11, the rotational movement of transfer ring 9 relative to the stationary motor clutch drive ring 10 exerts a force on rollers 43 which, due to the shape of the slots 41, has a radially inward component which causes the rollers 43 to move radially inward, the inner roller entering into one of the slots 45 of skirt 44 of sleeve 7. This decouples the handwheel clutch drive sleeve 7 from the motor clutch drive ring 10.

If, while the handwheel 60 is being manually rotated, the power should be turned on to drive the worm gear 11, the motor clutch drive ring 10 will be rotated but ring 10 will be uncoupled from the transfer ring 9 so long as ring 9 is being manually rotated. When however, with the power on, the manual operator stops rotating the handwheel, the compressed springs 31 (FIG. 8) function to return the sleve 7 to the centered position shown in FIG. 4. This moves the land 46 into alignment with the slots 42 and forces the rollers 43 radially outward in the slots 42. The outer roller of each pair is thus forced into one of the slots 41 in the rotating motor clutch drive ring 10, and the clutch drive transfer ring 9 thereby becomes coupled to the ring 10. Thus, the output drive sleeve 20 is now driven by the motor drive, and the handwheel is decoupled therefrom.

Slots 41 of ring 10 have side walls which are inclined relative to the radial, the slot in cross section having a truncated triangular configuration, as seen in FIGS. 5, 9, and 11. By reason of these inclined walls, the circumferential force exerted by the rotating ring 10 develops a radially inward force component which acts to urge the rollers 43 radially inwardly in the slots 42.

Similarly, the slots 45 in the skirt portion 44 of the handwheel clutch drive sleeve 7 have sloping or inclined side walls so that when the drive sleeve 7 is returned by springs 31 to its centered position relative to the handwheel clutch ring 8 (the centered position is illustrated in FIG. 4) the angular force exerted by the skirt 44 on the rollers 43 generates a radially outward component of force which urges the rollers 43 outwardly and into the slots 41 of the ring 10.

The walls of the slots 51 in the handwheel clutch drive ring 4 are also inclined, but the inclination is slight and substantially less than the inclination of the walls of the slots 41. The circumferential force exerted by the rotation of ring 4 on the trio of rollers 53 develops, when rollers guide 5 is stationary or relatively stationary, a radially inward force on the innermost roller which urges the innermost roller of each trio into the slots 56 and into the depressions 33.

The depressions in the upper portion of sleeve 7 are shown as being concave, for camming the inner roller of rollers 53 radially outward when the sleeve 7 is moved rotationally relative to the rollers guide 5.

The slots 56 in the collar 35 of the rollers guide 5 are shorter in length that the diameter of one of the rollers 53, so that when the inner roller of the trinodal arrangement of rollers is cammed inwardly by the outer rollers, as illustrated in FIG. 7, a portion of the inner roller projects beyond the slot 56 into the depression 33 of the sleeve 7.

It will be seen that the present invention provides a torque and thrust operator coupling selectively either a first drive 14 or a second drive 60 to output members 20 and 64 to drive said output members rotationally, said operator comprising: a clutch drive transfer ring 9 secured to said output members 20 and 64, said transfer ring 9 having through slots 42 carrying a plurality of first rollers 43 the length of said through slots being shorter than the sum of the diameters of said first rollers carried therein, whereby a portion of one first roller 43 projects radially from said slot 42, in one direction or the other; a first drive ring 10 coupled to said first drive 14, said first drive ring 10 having slots 41 therein for receiving the projecting portions of said first rollers 43; a second drive ring 4 coupled to said second drive 60, said second drive ring 4 having slots 51 for receiving and carrying a plurality of second rollers 53, a portion of one of said second rollers 53 projecting radially inwardly from each slot 51 of said second drive ring; a rollers guide 5 having through slots 56 for receiving the projecting second rollers 53 the length of said rollers guide slots 56 being shorter than the diameter of one of the second rollers 53, whereby the projecting second roller 53 projects radially from said slot in said rollers guide 5; a clutch drive sleeve 7 one end portion thereof being provided with a plurality of depressions 33 for receiving that portion of said second roller 53 which projects radially inwardly, the other end of said clutch drive sleeve 7 being provided with a plurality of slots 45 for receiving that portion of said first roller 43 which projects radially inwardly from the slot 42 in said clutch drive transfer ring 9, a clutch ring 8 secured to said transfer ring 9, said clutch ring having lugs 26 projecting radially inwardly, said clutch drive sleeve 7 having an outwardly extending center flange 28 received and supported by said clutch ring 8; the said flange 28 of said clutch drive sleeve 7 having radially outwardly extending portions 37 with projecting lugs 30; compression spring means 31 disposed circumferentially between the outwardly extending portions 37 of said flange 28 and the inwardly projecting lugs 26 of said clutch ring 8, said springs 31 tending to center the projecting lugs 30 of said flange 28 between pairs of inwardly projecting lugs 26 of said clutch ring 8, thereby to orient said clutch drive sleeve 7 angularly in such position that the nonslotted portions 46 of said other end of said clutch drive sleeve 7 are in radial alignment with the through slots 42 in said clutch drive transfer ring 9.

While the embodiments illustrated and described shows the use of cylindrical rollers, spherical rollers or spherical balls may be used. Accordingly, in the claims which follow, the term rollers should be understood to include spherical balls.

What is claimed is:

1. An operator for coupling selectively either a first drive (11) or a second drive (60) to an output member (20, 64) for driving said output member, said operator comprising: a clutch transfer ring (8, 9) secured to said output member, said clutch transfer ring having through slots (42) each carrying at least one roller (43), the length of said through slots being shorter than the total diameter of said rollers carried therein, whereby a portion of one roller projects radially from said slot in one direction or the other; a first clutch drive ring (10) coupled to said first drive (11), said first clutch drive ring having slots (41) therein for receiving the projecting portions of said rollers; a second clutch drive ring (4) coupled to said second drive (60), said second clutch drive ring having slots (51) for receiving and carrying a plurality of second rollers (53), a portion of one of said second rollers projecting radially inwardly from each slot of said second clutch drive ring; a rollers guide (5) having through slots (56) for receiving the projecting second rollers, the length of said rollers guide slots being shorter than the diameter of the second rollers, whereby projecting second rollers project radially from said slot in said rollers guide; a clutch drive sleeve (7) one end portion thereof being provided with a plurality of depressions (33) for receiving the portions of said second rollers which project radially inwardly, the other end (44) of said clutch drive sleeve being provided with a plurality of slots (46) for receiving the portions of said first-named rollers (43) which project radially inwardly from the slots in said clutch transfer ring (8, 9), said clutch transfer ring having lugs (26) projecting radially inwardly, said clutch drive sleeve (7) having an outwardly extending center flange received by said clutch transfer ring, the said flange of said clutch drive sleeve having radially outwardly extending portions (37) and projecting lugs (30); compression spring means (31) disposed circumferentially between the outwardly extending portions (37) of said flange and the inwardly projecting lugs (26) of said clutch transfer ring, said springs tending to center the outwardly projecting lugs (30) of said flange between pairs of inwardly projecting lugs of said clutch transfer ring, thereby to orient said clutch drive sleeve (7) angularly in such position that the non-slotted portions (46) of said other end of said clutch drive sleeve are in radial alignment with the through slots (42) in said clutch transfer ring.

2. Apparatus as claimed in claim 1 characterized in that said plurality of second rollers (53) in each slot (51) of said second drive ring (4) comprises three rollers in trinodal arrangement, with the radially inner roller located mainly in the slot (56) of said rollers guide (5).

3. Apparatus as claimed in claim 2 further characterized in that the slots (41) of said first clutch drive ring (10) have a radially outward closed end and a radially inward open end, the side walls of said slots being inclined, the open end of said slots being larger than the closed end.

4. Apparatus as claimed in claim 3 further characterized in that the peripheral edge of said rollers guide (5) is provided with friction material (34) for developing a limited amount of resistance against rotation of said rollers guide.

5. Apparatus as claimed in claim 4 further characterized in that said depressions (33) in said one end portion of said clutch drive sleeve (7) are concave arcuate.

6. Apparatus as claimed in claim 5 further characterized in that the side walls of the slots (45) in said other end (44) of said clutch drive sleeve (7) are inclined, the radially outward end of said slots being larger than the radially inward end.

7. An operator as claimed in claim 6 wherein said first clutch drive ring (10) encircles said clutch transfer ring (8, 9), said second clutch drive ring (4) encircles said one end portion of said clutch drive sleeve (7), said clutch transfer ring (8, 9) encircles said other end portion of said clutch drive sleeve (7), and said rollers guide (5) encircles said one end portion of said clutch drive sleeve (7) between said second drive ring (4) and the center flange of said clutch drive sleeve.

8. An operator for coupling selectively either a first drive (11) or a second drive (60) to an output member (20, 64) to drive said output member rotationally, said operator comprising: a clutch drive transfer ring (8, 9) secured to said output member, said transfer ring having a plurality of through slots angularly spaced about its periphery, said slots each carrying a plurality of first rollers, the length of said slots being shorter than the sum of the diameters of said first rollers carried therein, whereby a portion of one roller projects radially from each slot in one direction or the other; a first clutch drive ring (10) embracing said clutch transfer ring, said first clutch drive ring having a plurality of inwardly-facing slots angularly spaced for receiving projecting portions of said first rollers; a clutch drive sleeve (7) the lower end portion (44) of which is embraced by said clutch transfer ring, said clutch drive sleeve having an outwardly extending center flange received by said clutch drive transfer ring; a second clutch drive ring (4) coupled to said second drive, said second drive ring embracing the upper end portion of said clutch drive sleeve (7), said second drive ring having a plurality of inwardly-facing slots (51) angularly spaced, each of said slots receiving and carrying three rollers in trinodal arrangement, the radially inner of said rollers projecting radially inwardly from said slot of said second clutch drive ring; and annular rollers guide (5) embraced by said second drive ring and supported by said flange of said clutch drive sleeve, said rollers guide having a plurality of through slots (56) angularly spaced for receiving the projecting rollers of said trinodal arrangement, the length of the slots in said roller guide being shorter than the diameter of the projecting roller; the upper end portion of said clutch drive sleeve (7) being provided with a plurality of outwardly-facing depressions (33) angularly spaced apart for receiving that portion of the rollers of the trinodal arrangement which project radially inwardly beyond the slot in said rollers guide; said center flange of said clutch drive sleeve having a plurality of radially outwardly extending portions (37) and projecting lugs (30); said clutch drive transfer ring (8, 9) having a plurality of inwardly directed lugs (26) in the same horizontal plane as said outwardly projecting lugs (30) of said flange of said clutch drive sleeve; compression spring means (31) disposed between the lugs of said clutch drive sleeve and the lugs of said clutch drive transfer ring, said springs tending to center the outwardly projecting lugs (30) of said clutch drive sleeve between lugs (26) of said clutch drive transfer ring, thereby to bias angularly said clutch drive sleeve; the lower end portion of said clutch drive sleeve being provided with a plurality of pairs of slots (45) located in the same horizontal plane as the through slots (42) of said clutch drive transfer ring, the slots at the lower end of said clutch drive sleeve when said clutch drive sleeve is in its normal biased position being out of radial alignment with the through slots in said clutch drive transfer ring, whereby when said operator is driven by said first drive, said first rollers (43) in said through slots of said clutch drive transfer ring are prevented from moving inwardly beyond the non-slotted portion (46) of the wall at the lower portion of said clutch drive sleeve (7), and a portion of one roller thereby projects radially outwardly from each through slot and is received in the inwardly facing slots (41) of said drive ring, thereby coupling said drive ring to said transfer ring, and whereby when said operator is driven by said second drive, said clutch drive sleeve (7) is rotated by said second drive ring (4) and rollers guide (5) relative to said clutch drive transfer ring (8, 9), whereby slots of the pairs of slots (45) in the lower end portion of said clutch drive sleeve (7) come into radial alignment with the through slots (42) in said transfer ring, whereby said first rollers (43) are urged radially inwardly into said slots (42) of said transfer ring and said transfer ring becomes decoupled from said first clutch drive ring (10).

9. Apparatus as claimed in claim 8 characterized in that said slots (41) of said first clutch drive ring (10) have inclined side walls for camming said first rollers radially inwardly, and in that the slots (45) of the pairs of slots in the lower end of said clutch drive sleeve (7) have inclined side walls for camming said first rollers radially outwardly.

10. An operator coupling selectively either a first drive (11) or a second drive (60) to an output member (20, 64) to drive said output member rotationally, said operator comprising: a clutch drive transfer ring (8, 9,) secured to said output member, said transfer ring having a plurality of through slots (42) angularly spaced about its periphery, said slots each carrying a plurality of first rollers, the length of said slots being shorter than the sum of the diameters of said first rollers carried therein, whereby a portion of one roller projects radially from each slot (42) in one direction or the other; a first clutch drive ring (10) embracing said transfer ring, said first clutch drive ring having a plurality of inwardly-facing slots (41) angularly spaced for receiving projecting portions of said first rollers, said slots having inclined side walls for camming said rollers radially inward; a clutch drive sleeve (7) one end portion of which is embraced by said transfer ring (8, 9), said clutch drive sleeve having an outwardly extending center flange received within said transfer ring (8, 9); a second clutch drive ring (4) coupled to said second drive (60), said second clutch drive ring embracing the other end portion of said clutch drive sleeve (7), said second drive ring having a plurality of inwardly-facing slots (51) angularly spaced, each of said slots receiving and carrying a plurality of rollers (53) in trinodal arrangement, the innermost of said rollers projecting radially inwardly from said slot of said second drive ring; an annular rollers guide (5) embraced by said second drive ring and supported adjacent said flange of said clutch drive sleeve, said rollers guide having a plurality of through slots (56) angularly spaced for receiving the projecting rollers of said trinodal arrangement, the length of the slots in said rollers guide being shorter than the diameter of the projecting roller; the one end portion of said clutch drive sleeve being provided with a pluarlity of outwardly-facing depressions (33) angularly spaced apart for receiving the portion of the rollers of the trinodal arrangement which project radialy inwardly beyond the slot in said rollers guide; said center flange of said clutch drive sleeve having radially outwardly extending portions (37) and projecting lugs (30); said transfer ring (8, 9) having inwardly directed lugs (26) in the same horizontal plane as said outwardly projecting lugs (30) of said flange of said clutch drive sleeve; compression spring means (31) disposed between the lugs (30) of said clutch drive sleeve and the lugs (26) of said transfer ring, said springs tending to center the outwardly projecting lugs of said clutch drive sleeve between lugs of said transfer ring, thereby to bias angularly said clutch drive sleeve; the other end portion of said clutch drive sleeve being provided with a plurality of slots (45) located in the same horizontal plane as the through slots (42) of said transfer ring, the slots (45) at said other end of said clutch drive sleeve when said clutch drive sleeve is in its normal biased position being out of radial alignment with the through slots (42) in said transfer ring, whereby when said operator is driven by said first drive, said first rollers in said through slots of said transfer ring are stopped from moving inwardly beyond the non-slotted portion (46) of the wall at the said other end portion of said clutch drive sleeve, and a portion of one roller thereby projects radially outwardly from each through slot and is received in the inwardly facing slots (41) of said first drive ring (10), thereby coupling said first drive ring to said transfer ring (8, 9), and whereby when said operator is driven by said second drive, said clutch drive sleeve (7) is rotated by said second drive ring (4) and rollers guide (5) relative to said clutch drive sleeve (7), whereby slots (45) in the said other end portion of said clutch drive sleeve come into radial alignment with the through slots (42) in said transfer ring, whereby said first rollers are urged radialy inwardly into said slots (45) of said clutch drive sleeve and said clutch drive sleeve (7) becomes decoupled from said first drive ring (10), and whereby when said second drive terminates, said clutch drive sleeve (7) is returned by said compression spring means (31) to its normal biased position, said slots (45) in said other end portion of said clutch drive sleeve camming said first rollers radially outwardly into said slots (41) in said first clutch drive ring (10).

References Cited
UNITED STATES PATENTS

| | | | |
|---|---|---|---|
| 792,308 | 6/1905 | Brown | 192—35 |
| 2,487,387 | 11/1949 | Sears et al. | 192—48.9 XR |
| 2,803,323 | 8/1957 | Newell | 192—35 XR |
| 2,858,785 | 11/1958 | Kuhar | 192—107 XR |

BENJAMIN W. WYCHE III, *Primary Examiner.*

L. J. PAYNE, *Assistant Examiner.*